(12) United States Patent
Wallmeier et al.

(10) Patent No.: US 10,523,006 B2
(45) Date of Patent: Dec. 31, 2019

(54) CONTROLLER FOR AN INVERTER

(71) Applicant: DET International Holding Limited, George Town (KY)

(72) Inventors: Peter Wallmeier, Lippstadt (DE); Frank Schafmeister, Warburg (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 54 days.

(21) Appl. No.: 15/334,565

(22) Filed: Oct. 26, 2016

(65) Prior Publication Data
US 2017/0163038 A1 Jun. 8, 2017

(30) Foreign Application Priority Data
Dec. 1, 2015 (EP) .................................. 15197345

(51) Int. Cl.
*H02J 3/26* (2006.01)
*H02J 3/50* (2006.01)
(Continued)

(52) U.S. Cl.
CPC ................ *H02J 3/26* (2013.01); *H02J 3/005* (2013.01); *H02J 3/383* (2013.01); *H02J 3/50* (2013.01); *H02M 7/44* (2013.01); *Y02E 10/563* (2013.01)

(58) Field of Classification Search
CPC .... H02J 3/26; H02J 3/382; H02J 3/383; H02J 3/44; H02J 3/46; H02J 3/48; H02J 3/50; H02M 7/44; Y02E 10/563; Y02E 40/50
See application file for complete search history.

(56) References Cited

U.S. PATENT DOCUMENTS 6,239,997 B1 * 5/2001 Deng ..................... H02J 3/38
363/95
9,673,730 B2 * 6/2017 Zhang ..................... H02M 7/44
(Continued)

FOREIGN PATENT DOCUMENTS

DE 102011078047 A1 12/2012
EP 2348597 A1 7/2011
(Continued)

OTHER PUBLICATIONS

European Search Report for EP application No. 15197345.0, dated May 25, 2016.

*Primary Examiner* — Levi Gannon
(74) *Attorney, Agent, or Firm* — Vector IP Law Group LLC; Robert S. Babayi

(57) ABSTRACT

The present application relates to a controller arrangement for controlling an inverter for converting an input power from a power source to a multiphase AC output power provided at a power output of the inverter. The power output is connected to a load and additionally to a power grid. The controller arrangement includes a signal input for receiving a power signal per phase representative of at least one of the power per phase provided to the load or the power per phase provided to the power grid. The controller arrangement is further adapted to control each phase of the multiphase AC output power individually according to the corresponding power signal. The invention further relates to an inverter comprising such a controller arrangement, a power distribution arrangement comprising such an inverter and a controller arrangement to control the inverter and the invention further relates to a method for controlling such an inverter.

12 Claims, 4 Drawing Sheets

(51) Int. Cl.
*H02M 7/44* (2006.01)
*H02J 3/38* (2006.01)
*H02J 3/00* (2006.01)

(56) References Cited

U.S. PATENT DOCUMENTS

| | | | | |
|---|---|---|---|---|
| 9,812,949 | B2* | 11/2017 | Hintz | H02M 1/42 |
| 2012/0206945 | A1* | 8/2012 | Brogan | H02M 1/12 |
| | | | | 363/40 |
| 2012/0280566 | A1* | 11/2012 | Umland | H02J 3/26 |
| | | | | 307/32 |
| 2013/0182477 | A1* | 7/2013 | De Brabandere | H02J 3/383 |
| | | | | 363/95 |
| 2014/0334211 | A1* | 11/2014 | Somani | H02M 7/53875 |
| | | | | 363/131 |
| 2016/0072292 | A1* | 3/2016 | Rogers | H02J 3/46 |
| | | | | 307/62 |
| 2016/0372926 | A1* | 12/2016 | Pahlevaninezhad | H02J 3/382 |
| 2017/0104423 | A1* | 4/2017 | Wu | H02M 7/493 |
| 2017/0229857 | A1* | 8/2017 | Kral | H02H 7/28 |

FOREIGN PATENT DOCUMENTS

| | | | |
|---|---|---|---|
| WO | 2014118440 | A1 | 8/2014 |
| WO | 2014165938 | A1 | 10/2014 |

* cited by examiner

CONTROLLER FOR AN INVERTER

TECHNICAL FIELD

The invention relates to a controller arrangement for controlling an inverter for converting an input power from a power source to a multiphase AC output power provided at a power output of the inverter. The power output of the inverter is connected to a load and additionally to a power grid. The invention further relates to an inverter comprising such a controller arrangement, a power distribution arrangement comprising such an inverter and a controller arrangement to control the inverter and the invention further relates to a method for controlling such an inverter.

BACKGROUND ART

The world's power consumption is sharply increasing mainly due to the rapid industrial developments and the improved standards of living. Renewable power sources become more important through the increasing demand for power. Renewable power sources such as photovoltaic systems or wind farms represent a plurality of power sources that feed power into the public power grid.

There exist various types of power generation systems. There are common power generation systems that exclusively produce and provide power for the public power grid. Besides such large power generation systems there are local and smaller power generation systems that produce power for example for a premises. Common power generation systems with a renewable power source usually comprise an inverter that converts a produced direct current (DC) power to single or multiphase alternating current (AC) output power. From an output of the inverter the output power is provided to a local electrical load. For example the power consumption of a building may represent such a local load. The power output of the inverter is often connected additionally to the public power grid. If the power demand of the local load is less than the power provided from the power source the surplus power is fed into the public power grid. In case the local demand exceeds the power provided from the renewable power source, the missing power is obtained from the public power grid.

As the power production as well as the power consumption of the local load may vary over time often an energy storage device such as a battery is installed in order to temporarily store energy. The storage systems usually comprise a controller that controls the inverter. Based on the measured power demand and according to the present available power from the renewable power source the controller controls the inverter to charge or to discharge the storage device in order to meet the present power demand. Surplus power from the power source can be stored in the storage device. Exceeds the local power consumption the produced power additional power can be obtained from the storage device.

The ratio of the consumed power from the renewable energy source to the total of the produced power from the renewable energy source indicates the self-consumption ratio (SCR). Whereas the autonomy ratio (AR) indicates the ratio of the self-produced energy to the energy obtained from the grid.

Various types of controllers are known in the art that control the outgoing power or current of an inverter of a renewable power source in order to meet output power specifications or to meet public power grid requirements.

For example US 2013/0181527 A1 (Sinewatt Inc.) describes a solar photovoltaic energy collection and conversion system. The system has several string members that include a photovoltaic power source and a controller. The controller coordinates the output of each string member to achieve a desired power based on the performance or operation of each string member. The system includes converting the DC power to AC power, sharing or equalizing of the current from a string member to other string members or synchronizing the current generation among the string members in order to synchronize the current with the existing electrical grid. The strings may be arranged to form a single phase voltage output or three single phase strings may be grouped together electrically for a three-phase system.

A method for predictive phase balancing is disclosed in US 2014/0031998 (IBM). From receiving customer demand profiles the method creates a demand forecast from anticipated power demands. The method then breaks down loads for each customer by corresponding phases in a poly-phase power grid network so that the loads correspond to the anticipated power demands. The described system includes a power supplier with three circuit conductors that produce power in a three-phase process. A logic is configured to utilize a pre-defined maximum deviation or difference among the phases at a given time interval. The logic incrementally removes the smallest load from the phase identified as having the highest value and re-allocates the smallest load to the phase having the lowest value. A load is considered to be balanced when the load values are substantially equal.

U.S. Pat. No. 8,344,550 B2 (General Electric Comp.) discloses a power generation system with a renewable power source. The system comprises a source side converter, a source side controller, a grid side converter, a grid side controller, an electrical energy storage device and an energy storage controller. The grid side converter comprises a DC to AC inverter. The source and grid side converters comprise single phase or multi-phase configurations. The grid side controller receives grid feedback for use in providing grid switching signals to the grid side converter. Based on these signals the grid side converter adjusts the output power. That allows achieving grid interconnection requirements. For example energy that would have gone to grid can be absorbed in the energy storage device (battery). The energy storage controller controls the energy storage converter to achieve a desired power balance on the DC link. The power balance is achieved by power exchange between DC Link and the energy storage device.

The above mentioned controllers control the output power but they only consider the power grid requirements but not a local load for the controlling of the output power. There are controllers known in the art that control the output power provided to the public power grid to zero. That means the local load consumes more power from the renewable power source. Such controllers have the disadvantage that only the sum of a three-phase AC is controlled to zero. As the load often differs from one phase to another phase currents are not equal to zero. With a voltage being present at the output that means that some phases might feed power into the power grid. This unbalanced power feed in may cause grid disturbances. Further it is more efficient to consume the produced power from the power source by a local load than to feed it in the power grid.

SUMMARY OF THE INVENTION

It is an object of the invention to provide a controller arrangement as mentioned above that is able to flexibly adjust the output power in order to be able to react to different circumstances and requirements of the public power grid and also of the local load. Further objects of the invention are to provide a corresponding inverter, a power distribution arrangement comprising such a controller arrangement and a method for controlling such an inverter.

The solution of the invention is specified by the features of claim 1. According to the invention the controller arrangement includes a signal input for receiving a power signal per phase representative of at least one of the power per phase provided to the load or of the power per phase provided to the power grid. Furthermore the controller arrangement is adapted to control the inverter to control each phase of the multiphase AC output power individually based on the corresponding power signal per phase.

The individual controlling of each phase of the multiphase AC output power allows reacting individually to the power demand per phase. That means for the controlling the power provided to the load is not only considered as the total output power for all phases of the multiphase AC output power but the phases are considered individually. Hence, if the power demand of a phase is changing the corresponding phase of the output power can be adjusted.

Therefore one phase of the output power provided at a power output of the inverter differs from another. The individual controlling of each phase allows to flexibly adjust the output power to meet specific requirements of the load or of the power grid. Obviously this is only possible if the necessary adjustment of a phase lies within a controllable range. This controllable range depends on the input power as the controlled inverter has to arrange the available input power such that the output power of each phase follows a specified value given by the controller.

The individual controlling of each phase is advantageous for example if a load significantly requires more power in one single phase. In such a case the controller arrangement can arrange the available input power to the individual phases of the output power based on the demanded power per phase. But the controller arrangement also able to individually control each phase independent of the load. For example the controller arrangement can increase the power provided to the grid of one phase if it is required to feed in more power on a specific phase. In another embodiment the controller arrangement controls the inverter based on both, on the demanded power of the load and additionally on specific requirements of the grid.

The controller arrangement is related to a power system that at least comprises a source power, an inverter and a load. This means preferably the power source is producing the input power and that the source power is connected to the inverter. The inverter converts the input power to a multiphase AC output power provided at the power output of the inverter. This power output is preferably connected to the load and additionally to a power grid.

The controller arrangement for controlling the inverter includes at least one controller comprising at least one signal input for receiving a power signal per phase and at least one output for providing a control signal for controlling the inverter so that a control loop is established. To control the inverter the controller is preferably adapted to send the control signal to the inverter. The inverter then adjusts the output power according to the received control signal. The power output is adjustable by changing the output current or the output voltage or by changing both the output current and the output voltage. The controller is adapted to control each phase of the output power individually according to the corresponding power signal. That means for example the controller receives a signal for phase one and thus controls the inverter to adjust the output power of phase one.

It is irrelevant where the controller arrangement is located. It may be arranged in existing devices or it may be installed in a separate devices. The controller arrangement can be integrated in the inverter or it may be inside a separate device. Preferably, the controller arrangement is integrated in the inverter.

The term inverter should be understood to mean a device that converts an input current of the input power to a multiphase AC of the output power. Thereby the input current can be an AC having any frequency or the input current can be a DC. The term multiphase AC output power means that the output power may comprise two, three or more phases. The power grid is preferably a multiphase AC power grid, like for example a superior local grid of a premises or a common public three-phase power grid.

The load is connected to at least one phase of the multiphase AC. Preferably, the load is connected to all phases. The load should be understood to mean a load that is mainly supplied by the power source but it may from time to time be additionally supplied by the power grid. Preferably, the load is supplied by both, at a particular point in time the load is supplied by the input power and at another point in time it is supplied by power from the power grid. The load may for example correspond to the entirety of the power consuming devices of a premise. Power consuming devices are for example an electrical drive, an electrical heating, a lightning or any electrical installation that consumes electrical power.

The power signal per phase representing the power per phase provided to the load or to the power grid is preferably generated by a measuring device and comprises an indication of the current generated for example by an ampere meter, a voltage generated for example by a voltmeter or an indication of the power generated for example by a power meter. The measuring device is preferably located in front of the load to measure the power provided to the load. Alternatively the measuring device is located at a power grid interface to measure the power provided to the power grid. In this case the power provided to the load is obtained by subtracting the power provided to the grid from the total power output.

Preferably, the power signal is generated by an ampere meter. The ampere meter is well known and widespread. It allows measuring easily the current in order to determine the output power per phase provided to the load or provided to the power grid. For example, the power signal is generated by a current sensor or by any device that is capable to measure an electric current.

The power system preferably includes further measuring devices. Preferably, a power meter is located between the power source and the inverter to measure the input power. Preferably, a further power meter is located at the power output of the inverter to measure the total output power.

Preferably, the controller arrangement is adapted to control the inverter in order to balance across all phases a difference of the output power per phase of the inverter to the power per phase provided to the load.

The term "balance" should be understood to mean that the controller arrangement controls each phase of the output power individually such that the difference of the output power per phase of the inverter to the power per corresponding phase provided to the load is as far as possible equal from one phase to another. The balancing of said difference causes the surplus power provided to the grid or the power obtained from the grid to be symmetric.

Expressed in a mathematical form, that means that the controlled output power per phase minus the power provided to the load per phase yields the power provided to the power grid per phase. In this case the load per phase essentially corresponds to the power demand per phase. This power provided to the grid is far more symmetric between the phases than if only the sum of all phases is controlled to a specified value or to zero as it is known in the art from conventional controllers.

The power provided to the power grid is to some extent symmetric across all phases. This means that the power of one phase does not differ considerably to another. With this symmetry the handling of the produced input power is more efficient than with a power feed in with asymmetric phases. The reason is that the consumption of self-produced power is increased and the quantity of power fed in the power grid is reduced. It is more cost-effective to consume the produced input power than to obtain power from the grid. Hence, the individual controlling and balancing of the phases increases the self-consumption ratio as well as the autonomy ratio of a power generation system with a load. Furthermore symmetric phases may avoid grid disturbances in the power grid. In another preferred embodiment, the controller arrangement is adapted to control the inverter in order to balance across all phases the power provided to the grid. This has the same effect as balancing said difference of the output power per phase of the inverter to the power per phase provided to the load as described above. In a further embodiment the balancing across all phases is based on the power signal per phase representing the power provided to the grid and additionally on the power signal representing the power per phase provided to the load.

Alternatively to the above mentioned embodiments the controller arrangement is adapted to control the inverter in order to hold a constant or variable difference of the power provided to the load or of the power provided to the grid of one phase to another phase.

Preferably, the controller arrangement includes a phase line controller for each phase of the multiphase AC output power. The controller arrangement therefore comprises as many phase line controllers as the number of phases of the multiphase AC output. Hence, each phase has its own control loop with a power signal per phase that is fed back to the respective phase line controller and a respective phase line controller output. Therefore each phase is controlled individually by its phase line controller. In a preferred embodiment each phase line controller is a physically separate unit. This simplifies the maintenance and the error search in case of a malfunction. Alternatively, the phase line controllers of all phases are arranged in one physical unit. The controller of one phase may be an electronic component for example a microprocessor or a field-programmable gate array (FPGA) or the like. That means for example several electronic components each representing a controller for one phase are arranged in one physical unit.

Alternatively, there is not a controller for each phase, but one controller that controls sequentially all phases. That means the controller operates in a time-sharing mode by switching between one phase to another. The controller first processes the signal of phase one and controls phase one and then switches to phase two and then further to phase three. When the controller ran through all phases it will start again with phase one. Such a controller may comprise one single electronic component, preferably a microcontroller that has several outputs, preferably one for each phase. This embodiment allows a compact design as there is only one physical unit comprising all controllers.

Alternatively, the controller is not a physical unit but a separate logical unit. That means all phase line controllers are implemented in the software of the controller arrangement. There is a logical unit for each phase representing a phase line controller or alternatively, there is only one logical unit for all phase line controllers. This allows a very compact implementation of the phase line controllers. In an alternative embodiment the controller arrangement comprises both controllers as a physical unit and controllers in the form of a logical unit.

The phase line controllers are preferably arranged in an existing device such as an inverter, a control box, or inside any existing housing.

Preferably, the controller arrangement is adapted to control the inverter to transfer input power to an energy storage device connected to the inverter or from the energy storage device to the power output of the inverter.

That means each phase line controller of the controller arrangement is able to control the inverter to charge as well as to discharge the energy storage device. A person skilled in the art will recognize that the energy for charging the storage device preferably originates from the input power. Conversely, the power transferred from the energy storage device is provided by discharging the energy storage device. The power obtained from the energy storage is preferably provided at the power output of the inverter to feed the power to the load.

The energy storage device may comprise a long-term as well as a short-term storage. The energy storage device may comprise a direct or an indirect storage, a chemical, an electrical, a mechanical or a magnetic storage device. Therefore the term energy storage device comprises for example, a flywheel, a hydroelectric energy storage, a hydrogen storage, a compressed air energy storage or any other type of energy storage. The energy storage device is preferably a direct storage such as a battery or a capacitor but it may be any storage system that is suitable to store electrical energy.

The energy storage device allows storing surplus energy that is provided by the power source but currently not used by the load. In case of lack of energy for the local load the energy storage device can provide energy. Furthermore the energy storage device allows to control the output power provided to the power grid to a certain value, for example to meet specific power grid requirements or to optimize the power consumption of the load. However, with the energy storage device it is not necessarily needed to feed in power in the power grid or to obtain power from the power grid. Hence, the dependence of the power grid is reduced. This allows an efficient and economical handling of the produced power.

Alternatively, the power system may not include an energy storage system. Surplus power may be transformed in heat or it may be used to drive a machine or a motor or it may be transferred to the power grid or simply be wasted. In this case missing power is obtained from an external power grid.

In a preferred embodiment the controller arrangement is adapted to control the inverter such that a power per phase provided to the power grid equals zero. That means not only the power as a sum of all phases of the multiphase AC power provided to the grid equals zero but also the power of each single phase equals zero. For that each phase line controller controls the inverter to adjust the output power of each phase.

The power of each phase provided to the power grid equals zero within the range of possibility. Therefor the term "equal to zero" should not be understood as the exact number zero but as a range around zero.

This controlling to zero has the advantage that no power or almost no power is fed into the power grid. Thus the available input power is consumable locally by the load or the input power may be stored in the energy storage device. This is more efficient and more economical than feed in power to the power grid and to consume power from the power grid. Controlling the power provided to the power grid to zero increases the self-consumption ratio as well as the autonomy ratio. This allows a more autonomous operation and reduces the dependency of the power grid even more. Furthermore if no power is fed in the power grid there is also no risk for disturbing the power grid, for example in case the current, the voltage or frequency does not meet the grid requirements.

Alternatively, the power of each phase provided to the power grid may not equal to zero but equal to a certain value for example in order to meet specific power grid requirements.

Preferably, the controller arrangement is adapted to control the inverter such that the output power per phase equals the power per corresponding phase provided to the load. The output power per phase means preferably the power leaving the power output of the inverter. The power provided to the load means mainly the power consumption of the load. If the output power per phase equals the power per corresponding phase provided to the load the power provided to the power grid equals zero. To achieve that the phase line controller controls the inverter to adjust the output power of the corresponding phase according to the power signal per phase.

As the power consumption of the load may vary over time the phase line controllers preferably control the inverter constantly. To be able to provide an output power per phase equal to the power provided to the load the phase line controllers control the inverter to transmit input power to the energy storage device or to transmit energy from the storage device to the power output of the inverter. If for example the load has an increasing power demand on phase one the phase line controller receives this information with the power signal at its signal input. If the instantaneous power consumption of the load exceeds the instantaneous available input power the phase line controller preferably makes the inverter to discharge the energy storage device in order to transmit power from the energy storage device and therefore being able to provide sufficient output power of phase one.

In the case the input power from the power source exceeds the instantaneous power demand of for example phase one of the load the phase line controller preferably makes the inverter to charge the energy storage device in order to store the surplus power and thus adjusting the output power of phase one. This means the controlling ensures that the output power per phase equals the power per corresponding phase provided to the load and therefore no power is fed in the power grid and no power is sourced from the power grid. In other words controlling the output power per phase of the inverter in respect of the power per phase provided to the load by means of the energy storage device allows achieving a feed in power of each phase equal to zero.

This allows using optimally the produced power for a load as it may be more efficient and more economical to use the power from the power source than to feed it in to the power grid or to draw power from the power grid. Furthermore a feed in power where the power of each phase equals to zero avoids grid disturbances.

Alternatively, the output power is not equal to the power provided to the load. That means the power provided to the grid of one or more phases is not equal to zero. This may be advantageous if the power grid has special feed in requirements but in this case the ratio of the consumed power from a local source to the total of the produced power from the local source might not be optimal.

Preferably, the controller arrangement is adapted to control a current of each phase of the multiphase AC output power individually according to the corresponding power signal. As the voltage of the power grid or the voltage of the local load is usually a given factor, the output power of each phase is adjustable by controlling the output current. The power depends from the current and the voltage according to the basic principles of electrics.

Alternatively, the output current can be kept at a constant value and the voltage may be adjusted. Further alternatively, both the current and the voltage may be adjusted to control the output power.

Preferably, the number of phases of multiphase AC output power of the inverter is three.

As a three-phase power grid is standard the three-phase AC power is feedable in the power grid.

Alternatively, the multiphase AC output power may comprise only two phases or four or more phases.

The solution of the invention regarding the inverter is specified by the features of claim 8. The inverter converts an input power from a power source to a multiphase AC output power provided at a power output of the inverter. Preferably, the power output of the inverter is connectable to a load and additionally to a power grid, including a controller arrangement according to the invention as described above.

Including a controller arrangement means that the controller of the controller arrangement according to the invention is installed in the inverter, whereby the controller can be installed in the form of an electronic component or as a separate unit in the inverter.

The inverter may convert DC as well as AC input power to the multiphase AC output power. Further the inverter can work as current transformer to transform the input current to a higher or to a lower value. The function of the inverter is not limited to convert the current. For example the inverter can also include a voltage transformer to transform an input voltage to a higher or a lower output voltage having the same or any other frequency as the input voltage. By converting the input power from the power source to the output power the inverter ensures that the produced input power is usable by a load or that the input power meets the requirements of a power grid and thus the power is feedable into the power grid.

Furthermore, the solution of the invention regarding the power distribution arrangement is specified by the features of claim 9. According to the invention the power distribution arrangement comprises:
a) a power source for producing input power,
b) an inverter according to the invention for converting the input power to a multiphase AC output power provided at a power output of the inverter, where the power output is connectable to a load and additionally to a power grid,
c) an electrical energy storage device,
d) a measuring device providing a power signal per phase representative of at least one of
   a. the power per phase provided to the load
   b. the power per phase provided to the power grid and
e) a controller arrangement according to the invention as described above for controlling the inverter.

The inverter, the measuring device, the power grid as well as the power signal, the power provided to the load and the power provided to the power grid all according to the invention are described above.

Preferably, the power source of the power distribution arrangement is a renewable power source, more preferably a photovoltaic power source.

A renewable power source means a power source that produces renewable energy. Renewable power sources may comprise for example a photovoltaic system, a wind farm, a hydroelectric power station, a geothermal power station, a biogas plant, a tidal power station, heat pumps or a combination of two or more of these power sources. Renewable energy has the advantage that the energy comes from resources which are naturally replenished. Renewable energy resources exist over wide geographical areas in contrast to non-renewable energy sources, which are concentrated in a limited number of countries.

Alternatively, the power source may comprise non-renewable energy such as fossil fuels or nuclear fuels. The power source in this case may is for example nuclear power plant, a coal-fired power station, a gas power plant, a gasoline-fuelled generator or a combination of these power sources.

Preferably, the renewable power source provides a DC output power. Some of the renewable power sources like the photovoltaic systems generate DC power. DC power is easily storable in an energy storage device.

Alternatively, the input power may comprise AC power. Power sources like for example a generator, a wind farm or a hydroelectric power station generate AC power. In the case of an AC input power, a rectifier is preferably provided to convert the AC input power to DC input power that is fed to the inverter.

Preferably, the energy storage device of the power distribution arrangement includes a battery. The battery may be any kind of a battery. The battery may be a large battery with a capacity of several megawatt hours as it is used in relation with power plants. Preferably, the battery is of smaller size with a capacity of several kilowatt hours like it is used in the building technology. Preferably, the battery is a rechargeable battery. The battery has the advantage that energy can be stored simply. As there exists many types and sizes of batteries the storage capacity can be easily adjusted to the requirements of a specific application.

Alternatively, the energy storage device may comprise a pumped hydro storage, compressed air storage, flywheel energy storage, a hydrogen storage system or a magnetic energy storage.

Preferably, the load corresponds to an entirety of power consuming devices of a premises.

The premises may include for example a building, a factory, an estate or a property as well as a store or the like. Preferably, the premises are a building including all its electrical installations like for example an electrical heating, the light installation and all other electrical loads of a building. In case of residential premises, the load is constituted for example by an electrical heating, the electric light installation, kitchen appliances, washing machine, dryer, fridge, freezer, iron, radio, television or the like. "The entirety of power consuming devices" means all devices that consume power at a particular moment. Therefore the load may correspond to a single device or to several power consuming devices. For example if in a household only the washing machine is consuming power then only the washing machine corresponds to the load. The load may therefore also rapidly change over time if for example a cooktop is switched at the same time as the fume cupboard and the oven.

Alternatively the load may include a machine, a drive, a light installation or an electrical heating.

The solution of the invention regarding the method is further specified by the features of the claims. The invention relates to a method for controlling an inverter for converting an input power from a power source to a multiphase AC output power provided at a power output of the inverter, the converter being connected to a load and additionally to a power grid, characterized by the steps of:
a) receiving a power signal per phase representative of at least one of the power per phase provided to the load or of the power per phase provided to the power grid,
b) controlling each phase of the multiphase AC output power individually according to the corresponding power signal.

The inverter, the power source, the load, the power grid as well as the input power, the multiphase AC output power, the power signal, the power provided to the load and the power provided to the grid of the method are described above.

Preferably, the controller arrangement controls the inverter to transmit input power to an energy storage device connected to the inverter or from the energy storage device to the power output. Said energy storage device is described above.

Preferably, the controller arrangement controls the inverter such that a power per phase provided to the power grid equals zero.

Preferably, the controller arrangement controls the inverter such that the output power per phase equals the power per corresponding phase provided to the load.

Preferably, the controller arrangement controls a current of each phase of the multiphase AC output power individually according to the corresponding power signal.

Other advantageous embodiments and combinations of features come out from the detailed description below and the totality of the claims.

BRIEF DESCRIPTION OF THE DRAWINGS

In the figures, the same components are given the same reference symbols.

PREFERRED EMBODIMENTS

Figure 1:
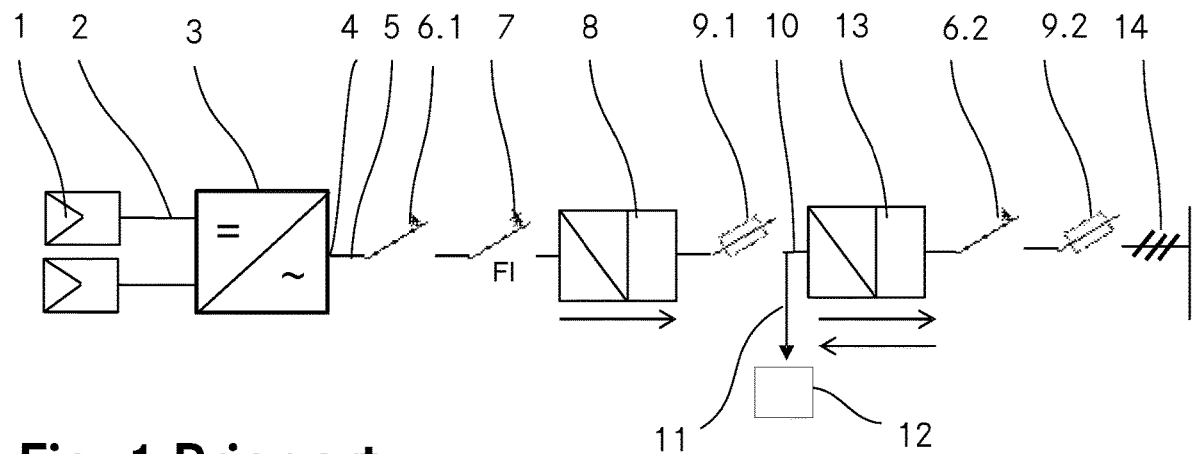
FIG. 1 is a schematic circuit diagram of a state of the art power system including a photovoltaic system with an inverter that is connected to a load and to a power grid.

FIG. 1 shows a schematic circuit diagram of a power system with a load as it is known in the art used for a domestic installation. The power source is a photovoltaic (PV) system 1 that is connected to an inverter 3. The inverter 3 has a three-phase power output 4. To this power output 4 a unidirectional energy meter 8 is connected. There is a circuit breaker 6.1 and a residual-current circuit breaker (RCCB) 7 between the inverter 3 and the energy meter 8. Subsequent to the energy meter 8 and after a fuse switch 9.1 an electrical load 12 is connected. At this point there is further a connection to a public three-phase power grid 14. In the direction from the load 12 to the power grid 14 there is further a bidirectional energy meter 13, a second circuit breaker 6.2 and a second fuse switch 9.2 provided.

Preferably, the load 11 corresponds to the entirety of power consuming devices of a building or premises that actually is consuming power at a particular time. Hence, the load may correspond for example to a heat pump, water heaters, an electric stove, a refrigerator, a freezer, lighting, a dishwasher, a washing machine, a television and all other electric or electronic devices used in a household.

The photovoltaic system 1 produces a DC input power 2 that is converted by the inverter 3 preferably to a three-phase AC output power 5 provided at the power output 4 of the inverter 3. With this power output 4 the inverter 3 is connected to the load 12 and additionally to the power grid 14. Therefore the produced power 5 can be provided to the load 12 as well as to the power grid 14. Depending on the quantity of the produced input power 2 the power can be only provided to the load 12 or the entire output power 5 can be fed into the power grid 14. As another option the input power 2 may be divided. That means a partial quantity of the output power 5 is provided to the load 12 and another partial is provided to the power grid 14. On the other hand if the power demand of the load 12 exceeds the available input power 2 of the PV system 1 additional power 10 can be obtained from the power grid 14. If the PV system does not produce any power at all due to lack of sunlight all power provided to the load 11 is sourced from the power grid 14. The unidirectional energy meter 8 measures the quantity of the power going from the inverter 3 to the load 12 or to the power grid 13. The bidirectional energy meter 13 measures the quantity of the power provided to the power grid 10 or it measures the quantity of the power obtained from the power grid 13. The circuit breakers 6.1, 6.2 protect the electrical circuit from damage caused by overload or short circuit. In case of a fault the circuit breakers 6.1, 6.2 interrupt the current flow. Circuit breaker 6.1 allows disconnecting the PV system 1 with the inverter from the load 12 and from the power grid 14 whereas the circuit breaker 6.2 can disconnect the PV system 1 with the inverter and the load 12 from the power grid 14. The RCCB 7 disconnects the PV system 1 with the inverter 3 from the load 12 and from the power grid 14 if the RCCB 7 detects that the current is not balanced between energized conductors and neutral conductor. The fuse switches 9.1, 9.2 provide overcurrent protection.

Figure 2:
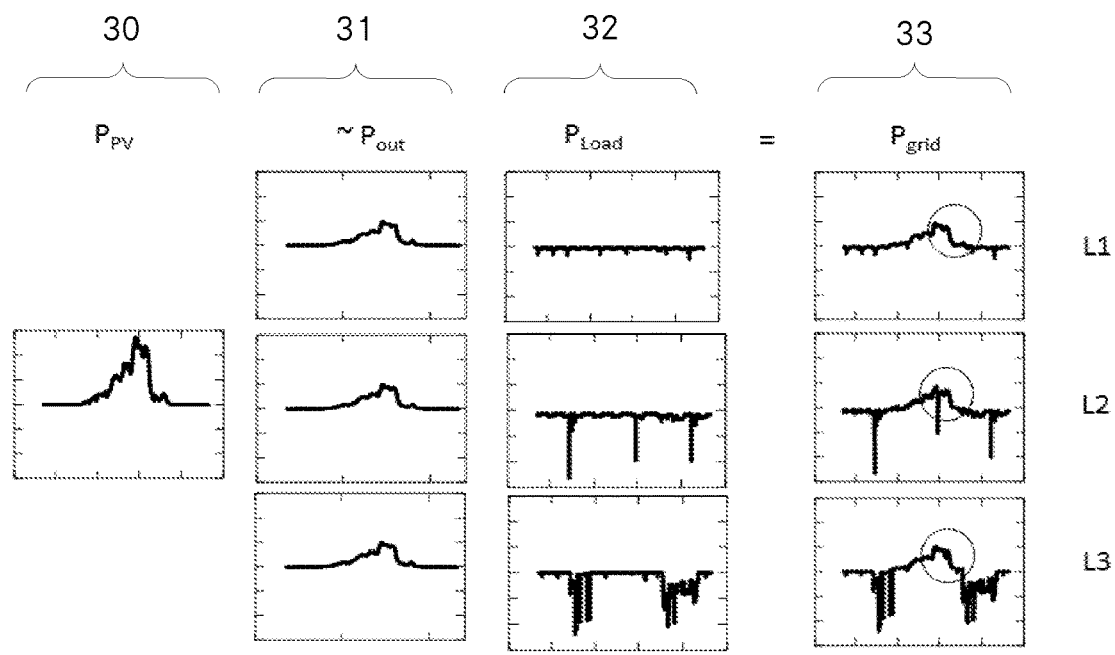
FIG. 2 shows power-time diagrams of a three-phase AC power according to the state of the art system of FIG. 1.

FIG. 2 shows the power-time diagrams of the three-phase power of the power system with load as described above. The horizontal axis of the diagram represents the time and the vertical axis of the diagram represents the power. Column 30 shows a power-time diagram of the produced input power $P_{PV}$ (no 2, FIG. 1) by the PV system 1. Column 31 shows power-time diagrams for the three-phase AC output power $P_{out}$ (no 5, FIG. 1) of the inverter 3 wherein phase one L1 is the first row, phase two L2 is the second row and phase three L3 is the third row. As shown the output of one phase is equal to another. Column 32 shows the power provided to the load $P_{load}$ (no 11, FIG. 1). The power provided to the load $P_{load}$ mainly equals the power demand of the load (no 12, FIG. 1). As the load does not consume power symmetrically on all three phases the power provided to the load differs from phase to phase. The output power of a phase minus the power of the corresponding phase provided to the load yields to the power per phase provided to the power grid $P_{grid}$ (no 10, FIG. 1) shown in column 33. Due to the asymmetric power demand the power provided to the power grid differs from one phase to another (marked peaks).

Figure 3:
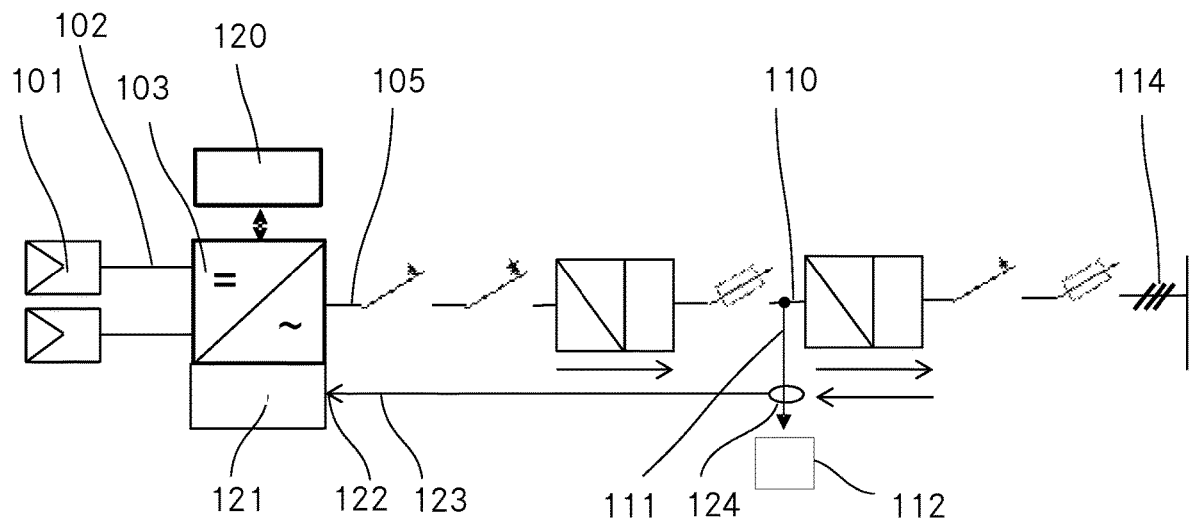
FIG. 3 is a schematic circuit diagram of a state of the art power system as shown in FIG. 1 additionally with battery storage and with a control loop.

FIG. 3 shows a schematic circuit diagram of another embodiment of a power system with a load known in the art. The system in FIG. 3 is the same as the system described in FIG. 1. But additionally to the components described in FIG. 1 the inverter 103 in FIG. 3 comprises a controller 121. The controller 121 has a signal input 122 for receiving a power signal 123. The system further comprises a power meter 124 that measures the power provided to the load 111 and generates the power signal 123. Further the system comprises a battery storage 120 that is connected to the inverter 3.

The controller 103 controls the output power 105 in order to minimize to power provided to the power grid 110. This is desirable as it is more efficient and more economical to use the produced input power 102 from the PV system 101 than to feed in power into the power grid 114 or to obtain power from the power grid 114. Therefore the controller 121 controls the inverter 103 to charge or to discharge the battery storage 120. In case the produced power exceeds the power demand of the load 112 the surplus power is not fed into the power grid 114 but the controller 121 controls the inverter 103 to store the surplus power in the battery storage 120. In case the power demand of the load 112 exceeds the available input power 102 the controller 121 controls the inverter 103 to discharge the battery storage 120 in order to provide enough output power 105. For this controlling the controller 121 receives the power signal 123 from the power meter 124. The power meter 124 indicates the instantaneous power provided to the load 111. In this embodiment the controller 121 is integrated in the inverter 103 which allows a space-saving integration.

Figure 4:
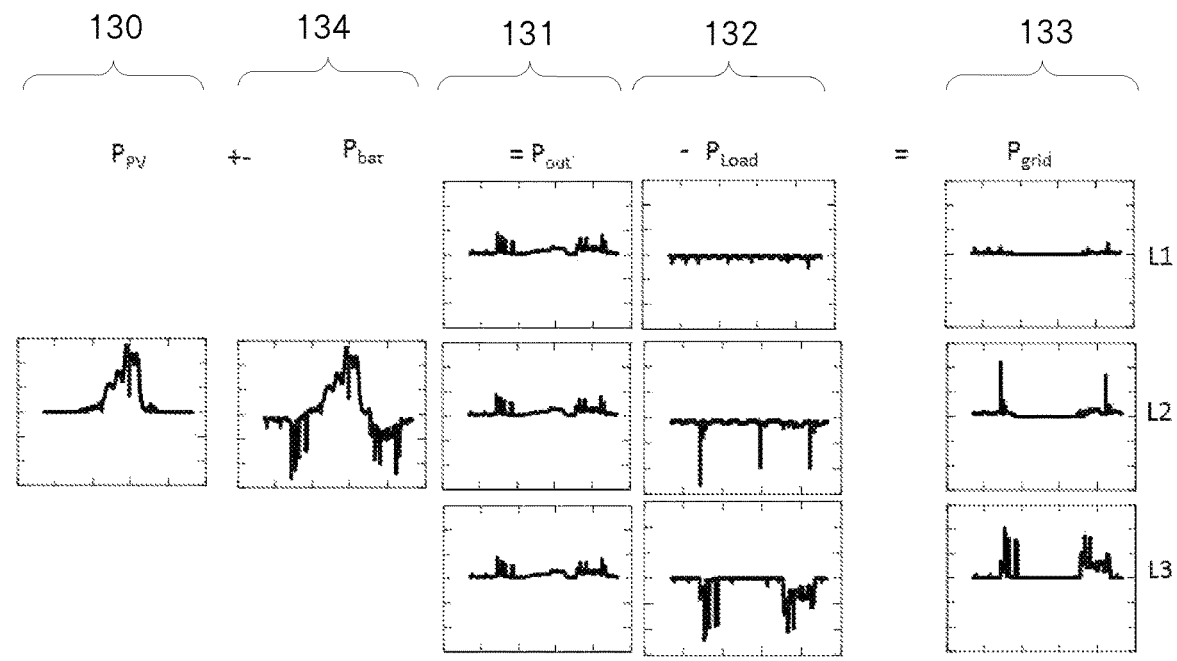
FIG. 4 shows power-time diagrams of a three-phase AC power according to the state of the art system of FIG. 3.

FIG. 4 shows the power-time diagrams of the three-phase power of the system described in FIG. 3. Column 130 shows the power input $P_{PV}$ (no 102, FIG. 3) of the PV system. Depending on the quantity of the input power and depending on the power provided to the load $P_{load}$ (no 111, FIG. 3) the battery storage (no 120, FIG. 3) is charged or discharged as described above. This means to the input power is a certain quantity of power $P_{bat}$ added or subtracted, shown in column 134. This yields to an adjusted output power $P_{out}$ (no 105, FIG. 3) shown in column 131. As it is shown each phase has the same output power. The power provided to the load shown in column 132 has to be subtracted from the output power to get to the power provided to the grid $P_{grid}$ (no 110, FIG. 3) shown in column 133. Due to the asymmetric load each phase of the power provided to the grid differs from one phase to another. As it is shown the feed in power of phase one L1 equals almost zero wherein the feed in power of phase two L2 and phase three L3 have significant power peaks. This unbalanced power feed in is undesirable as it may cause grid disturbances.

The controller tries to keep the power provided to the grid to zero. As the control variable—that means the power transmitted from or to the battery storage—is the same for all phases it is obviously impossible to control all phases to zero.

Figure 5A:
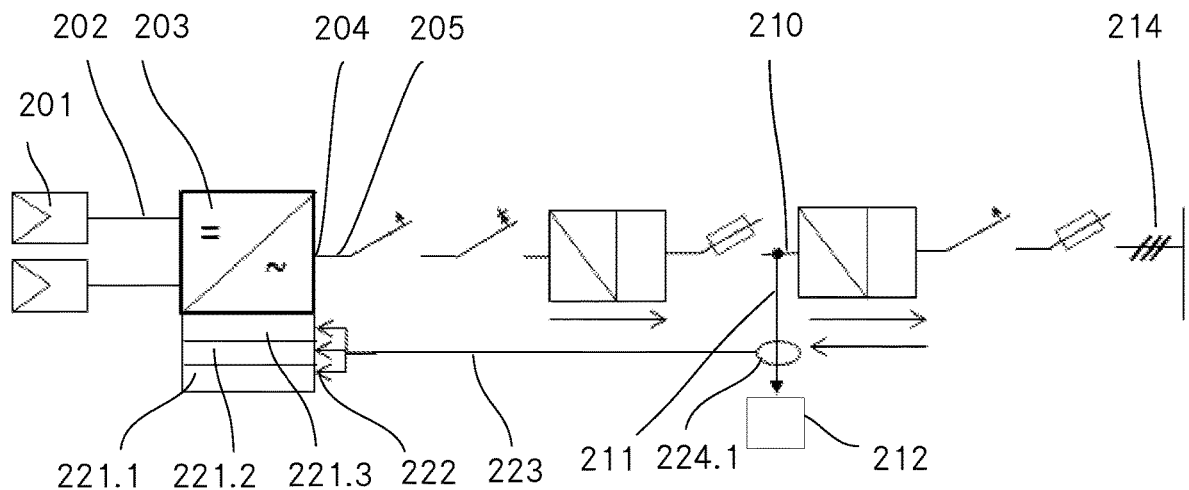
FIGS. 5a and 5b show a schematic circuit diagram of a power system according to the invention with a phase line controller for each phase.

FIG. 5a shows a power system with a load according to the present invention including a PV system 201 that is connected to an inverter 203. The system is similar to the system shown FIG. 3. In contrast to the state of the art system shown in FIG. 3 the power system with load according to the invention comprises three phase line controllers 221.1, 221.2, 221.3.

That means there is a phase line controller 221.1, 221.2, 221.3 for each phase and thus each phase has its own control loop. The power signal 223 generated by the power meter 224.1 comprises the instantaneous power provided to the load 211 for each phase. The phase line controllers 221.1, 221.2, 221.3 receive the power signal 223 per phase and control the inverter 203 to adjust the output power 205 of the corresponding phase. That means if for example the power demand of phase one is increasing the phase line controller of phase one 221.1 receives this information through the power signal 223 at its signal input 222 and therefore controls the converter 203 to increase the output power 205 at the power output 204 of phase one. The same control loop exists for phase two and three.

Figure 5B:
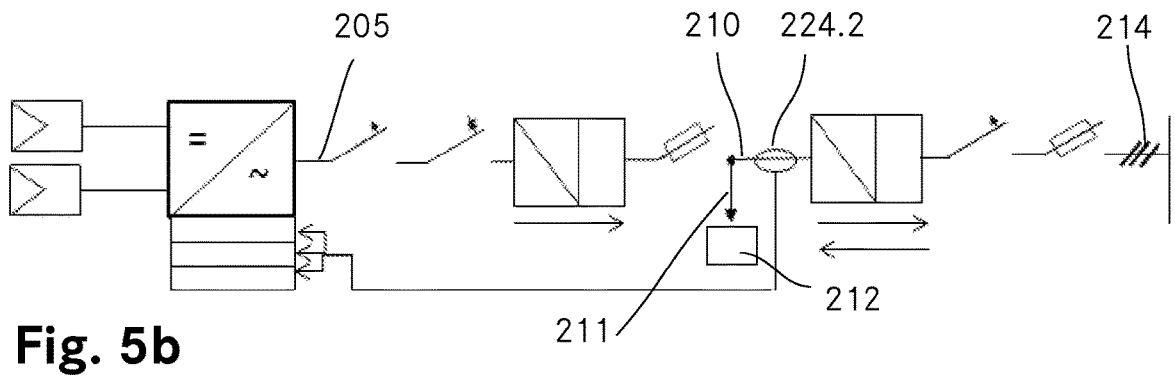

FIG. 5b shows a slightly different embodiment of the system described in FIG. 5a. In contrast to the system of FIG. 5a the embodiment in FIG. 5b shows a system where the power meter 224.2 is located between the load 212 and the power grid 214. Hence, the power meter 224.2 measures the power provided to the grid 210. The power provided to the load 211 is obtained by subtracting the measured power provided to the grid 214 from the total output power 205.

Figure 6:
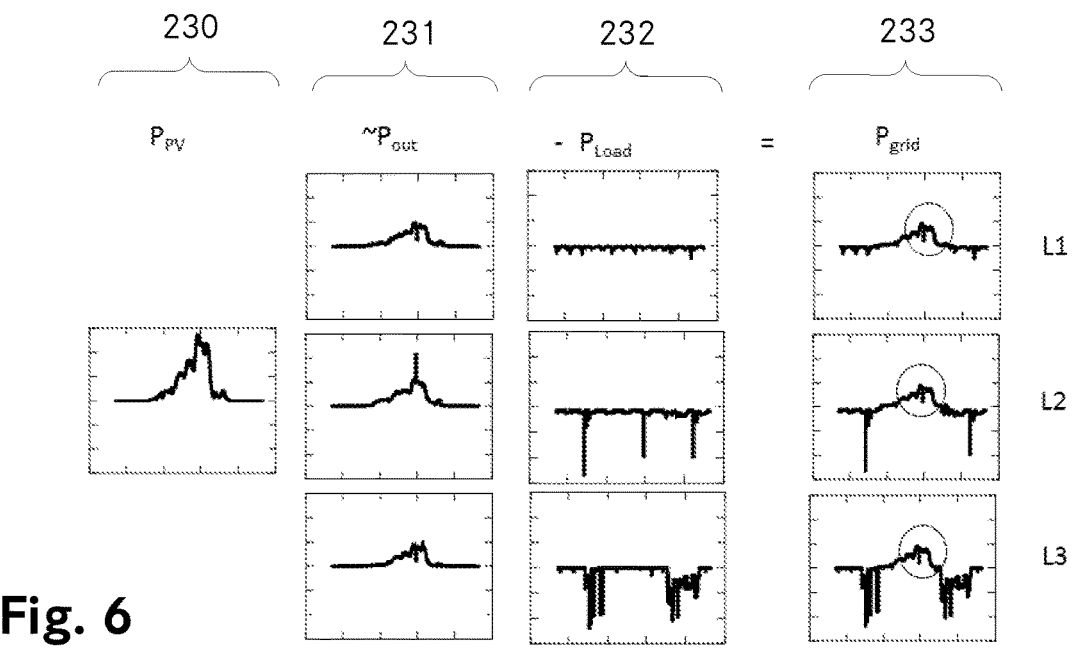
FIG. 6 shows power-time diagrams of a three-phase AC power according to the system of FIG. 5a or 5b.

FIG. 6 shows the power-time diagrams of the three-phase power system described in FIG. 5a or 5b. In contrast to systems known in the art the inverter (no 203, FIG. 5a) according to the present invention can output an output power (no 205, FIG. 5a) that differs from one phase to another. Column 230 shows the produced input power $P_{PV}$ (no 202, FIG. 5a) and column 231 shows the output power $P_{out}$. The output power of each phase is adjusted according to the power provided to the load $P_{load}$ (no 211, FIG. 5a) shown in column 232. The resulting power provided to the power grid $P_{grid}$ (no 210, FIG. 5a) is shown in column 233.

The possibility to individually adjust each phase output according to the power signal 223 per phase allows reducing the power feed into to the power grid 214. As it is more cost-effective to consume the produced input power 202 than to obtain power from the power grid 214, the phase controls 221.1, 221.2, 221.3 allow an efficient power supply of the load 212. Thanks to the individual controlling of the phases the self-consumption ratio (SCR) and the autonomy ratio (AR) are increased. Concretely, the system described in FIG. 5a/5b has a SCR of 15% and an AR of 16% if the phases of the output power 205 are not controlled individually. The same system in the same operating conditions but with individual phase line controllers reaches a SCR of 23% and an AR of 25%. Thus the improvement is for the SCR is 8%. Furthermore controlled phases avoid undesirable disturbances on the power grid. For the described system with no individual controlling of the phases the measured energy going to power grid is 9.45 kWh. In the same operating conditions but with individual controlling of the phases the energy going to the grid can be reduced to 8.8 kWh and grid stress is thus reduced by 7%.

Figure 7:
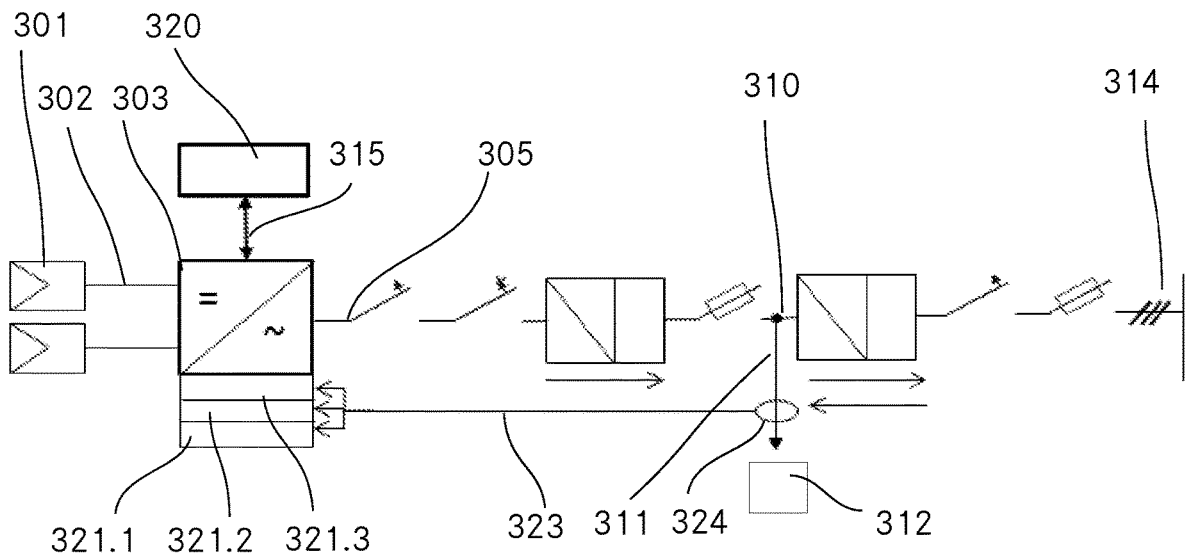
FIG. 7 is a schematic circuit diagram of a power system according to the invention with a phase line controller for each phase and with an energy storage device.

FIG. 7 shows another embodiment of the present invention. The system corresponds to the embodiment described in FIG. 5a/5b but additionally the system in FIG. 7 comprises a battery storage 320. Each phase line controller 321.1, 321.2, 321.3 is able to control the inverter 303 to charge or to discharge the battery storage 320 in order to store or to obtain energy. This offers more control possibilities than the embodiment described in FIG. 5a/5b. That means if the power demand of a phase exceeds the available input power 302 from the photovoltaic system 301 the phase controls 321.1, 321.2, 321.3 make the inverter 303 to discharge the battery storage 320 in order to obtain the missing power. Conversely, if the produced input power 302 exceeds the power demand of the phases the surplus energy can be stored in the battery storage 320. That offers the possibility to control each phase of the power provided to the power grid 310 to zero.

The power meter 324 may also be located between the load 312 and the power grid 314 as shown in FIG. 5b.

Figure 8:
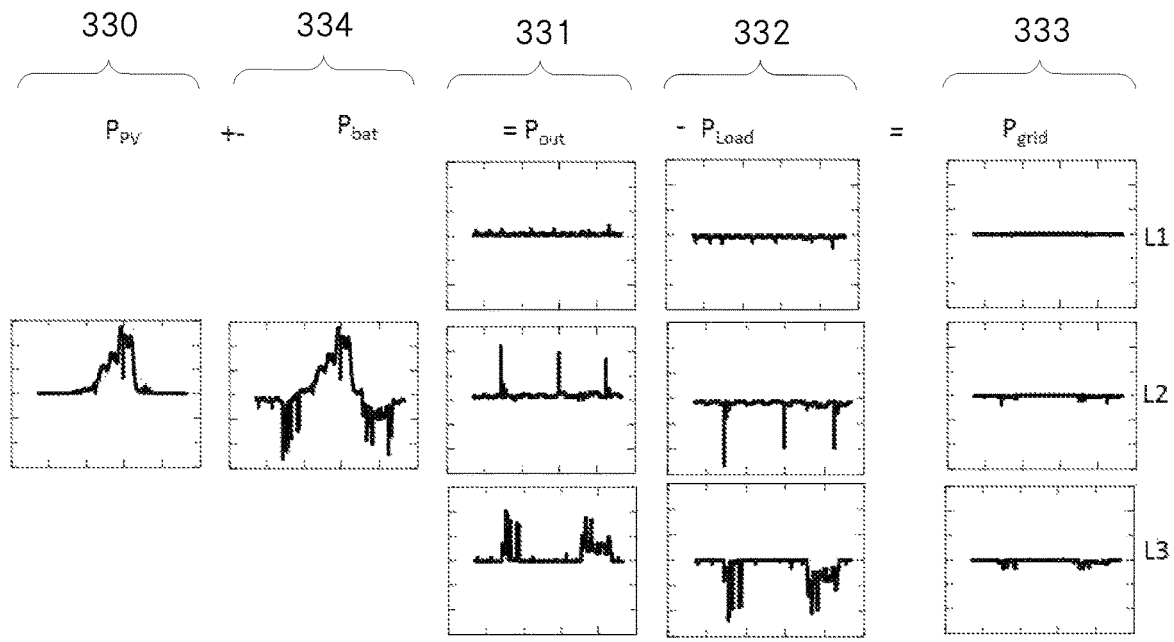
FIG. 8 shows power-time diagrams of a three-phase AC power according to the system of FIG. 7.

FIG. 8 shows the power-time diagrams of the power system described in FIG. 7. Column 330 shows the produces input power $P_{PV}$ (no 302, FIG. 7). Column 334 shows the quantity of power going to the battery storage (no 315, FIG. 7) or the quantity that is obtained from the battery storage. Correspondingly the power output $P_{out}$ (no 305, FIG. 7) shown in column 331 is the result of the input power plus the power coming from the battery $P_{bat}$ (no 315, FIG. 7) respective the input power minus the power going to the battery. To achieve a zero power output to the power grid $P_{grid}$ (no 314, FIG. 7) of each phase the phase line controllers (no 321.1, 321.2, 321.3, FIG. 7) control the inverter (no 303, FIG. 7) to adjust the output power such that the output power of each phase equals the power provided to the load $P_{load}$ (no 311, FIG. 7) per phase. As it can be seen from column 331 the controlled output power equals the power provided to the load 332 but has the opposite algebraic sign in order to get a zero power output of each phase to the power grid. Indeed, the power provided to the grid shown in column 333 equals mainly zero. These controlling increases the self-consumption ratio and the autonomy ratio even more than the embodiment without battery storage described in FIG. 5a/5b.

The invention claimed is:

1. A controller configured to control an inverter that converts an input power from a power source to a multiphase AC output power provided at a power output of the inverter having a first phase and a second phase, wherein the first phase and the second phase of the power output are connected to a load and additionally to a power grid, the controller comprising:
   a first signal input for receiving a first power signal for the first phase representative of at least one of:
      i. the power of the first phase provided to the load, or
      ii. the power of the first phase provided to the power grid;
   a second signal input for receiving a second power signal for the second phase representative of at least one of:
      i. the power of the second phase provided to the load, or
      ii. the power the second phase provided to the power grid;
   wherein the controller is adapted to control each of the first phase and the second phase of the multiphase AC output power individually based on a corresponding power signal of the first phase and the second phase, and wherein the controller is further configured to increase self-consumption by controlling the inverter to transfer input power to an energy storage device connected to the inverter as well as to transfer power from the energy storage device to the power output of the inverter based on the corresponding power signal of the first phase and the second phase such that a first power phase and a second power phase provided to the power grid equals zero and such that the output power of the first phase and the second phase equal the power per corresponding first phase and second phase provided to the load, wherein if a power demand of the first phase or the second phase exceeds the input power the energy storage device is discharged and if the input power exceeds the power demand of the first phase or the second phase the energy storage device is charged.

2. The controller of claim 1 further configured to control a current of each phase of the multiphase AC output power individually according to the corresponding power signal.

3. The controller of claim 1, wherein the inverter is controlled in order to balance across all phases a difference of the output power per phase of the inverter to the power per phase provided to the load.

4. The controller of claim 1 further comprising a phase line controller for each phase of the multiphase AC output power.

5. An inverter configured to convert an input power from a power source to a multiphase AC output power provided at a power output of the inverter having a first phase and a second phase, wherein the first phase and the second phase of the power output are connected to a load and additionally to a power grid, said inverter having a controller comprising:
  a first signal input for receiving a first power signal for the first phase representative of at least one of:
    i. the power of the first phase provided to the load, or
    ii. the power of the first phase provided to the power grid;
  a second signal input for receiving a second power signal for the second phase representative of at least one of:
    i. the power of the second phase provided to the load, or
    ii. the power the second phase provided to the power grid;
  wherein the controller is adapted to control each of the first phase and the second phase of the multiphase AC output power individually based on a corresponding power signal of the first phase and the second phase, and wherein the controller is further configured to increase self-consumption by controlling the inverter to transfer input power to an energy storage device connected to the inverter as well as to transfer power from the energy storage device to the power output of the inverter based on the corresponding power signal of the first phase and the second phase such that a first power phase and a second power phase provided to the power grid equals zero and such that the output power of the first phase and the second phase equal the power per corresponding first phase and second phase provided to the load, wherein if a power demand of the first phase or the second phase exceeds the input power the energy storage device is discharged and if the input power exceeds the power demand of the first phase or the second phase the energy storage device is charged.

6. A power system, comprising:
  a) a power source for producing input power,
  b) an inverter for converting the input power to a multiphase AC output power provided at a power output having a first phase and a second phase, wherein the first phase and the second phase of the power output are connected to a load and additionally to a power grid,
  c) an electrical energy storage device connected to the inverter,
  d) a measuring device providing a first power signal for the first phase representative of at least one of:
    i. the power of the first phase provided to the load
    ii. the power of the first phase provided to the power grid, and
  a second power signal for the second phase representative of at least one of:
    i. the power of the second phase provided to the load, or
    ii. the power the second phase provided to the power grid:
  a controller configured to control each of the first phase and the second phase of the multiphase AC output power individually based on a corresponding power signal of the first phase and the second phase, and wherein the controller is further configured to increase self-consumption by controlling the inverter to transfer input power to an energy storage device connected to the inverter as well as to transfer power from the energy storage device to the power output of the inverter based on the corresponding power signal of the first phase and the second phase such that a first power phase and a second power phase provided to the power grid equal zero and such that the output power of the first phase and the second phase equal the power per corresponding first phase and second phase provided to the load, wherein if a power demand of the first phase or the second phase exceeds the input power the energy storage device is discharged and if the input power exceeds the power demand of the first phase or the second phase the energy storage device is charged.

7. The power system of claim 6, wherein the power source is a renewable power source.

8. The power system of claim 6, wherein the renewable power source comprises a photovoltaic power source.

9. The power system of claim 6, wherein the energy storage device comprises a battery.

10. The power system of claim 6, wherein the load corresponds to a power consuming devices of a premises.

11. A method for controlling an inverter for converting an input power from a power source to a multiphase AC output power provided at a power output having a first phase and a second phase, said power output, wherein the first phase and the second phase of the power output are connected to a load and additionally to a power grid, said method comprising the steps of:
  a) receiving a first power signal for the first phase representative of at least one of:
    i. the power of the first phase provided to the load
    ii. the power of the first phase provided to the power grid, and
  a second power signal for the second phase representative of at least one of the power of the second phase provided to the load, or the power the second phase provided to the power grid;
  b) controlling each of the first phase and the second phase of the multiphase AC output power individually according to a corresponding power signal of the first phase and the second phase; and
  c) increasing self-consumption by controlling the inverter to transfer input power to an energy storage device connected to the inverter as well as to transfer power from the energy storage device to the power output of the inverter based on the corresponding power signal of the first phase and the second phase such that a first power phase and a second power phase provided to the power grid equals zero and such that the output power of the first phase and the second phase equals the power per corresponding first phase and second phase provided to the load, wherein if a power demand of the first phase or the second phase exceeds the input power the energy storage device is discharged and if the input power exceeds the power demand of the first phase or the second phase the energy storage device is charged.

12. The method of claim 11, wherein the controller arrangement controls a current of each phase of the multi-phase AC output power individually according to the corresponding power signal.

* * * * *